(12) United States Patent
Jordan et al.

(10) Patent No.: US 7,712,566 B2
(45) Date of Patent: May 11, 2010

(54) BICYCLE TRANSMISSION

(75) Inventors: Brian Jordan, Chicago, IL (US); Kevin Wesling, Lombard, IL (US); Christopher Shipman, Chicago, IL (US)

(73) Assignee: SRAM, LLC, Chicago, IL (US)

( * ) Notice: Subject to any disclaimer, the term of this patent is extended or adjusted under 35 U.S.C. 154(b) by 0 days.

(21) Appl. No.: 12/188,889

(22) Filed: Aug. 8, 2008

(65) Prior Publication Data

US 2008/0300096 A1 Dec. 4, 2008

Related U.S. Application Data

(63) Continuation of application No. 11/734,236, filed on Apr. 11, 2007.

(51) Int. Cl.
*F16H 7/18* (2006.01)
(52) U.S. Cl. .................................................. 180/260
(58) Field of Classification Search ............... 280/238, 280/260; 475/312, 8, 297
See application file for complete search history.

(56) References Cited

U.S. PATENT DOCUMENTS

| 1,395,067 | A | * | 10/1921 | Warren | 475/312 |
| 2,189,220 | A | * | 2/1940 | Osborne | 475/258 |
| 4,854,191 | A | | 8/1989 | Nagano | |
| 5,303,942 | A | | 4/1994 | Schlumpf | |
| 5,609,071 | A | | 3/1997 | Schlumpf | |
| 5,620,384 | A | | 4/1997 | Kojima | |
| 5,895,336 | A | | 4/1999 | Yoo | |
| 2003/0186776 | A1 | | 10/2003 | Wu | |

FOREIGN PATENT DOCUMENTS

| EP | 0 159 855 A2 | 10/1985 |
| EP | 0 922 630 B1 | 6/1999 |
| WO | WO 99/46159 | 9/1999 |

* cited by examiner

*Primary Examiner*—Kevin Hurley
*Assistant Examiner*—Levon Fiore
(74) *Attorney, Agent, or Firm*—Milan Milosevic; Lisa Serdynski (57) ABSTRACT

A bicycle transmission assembly that is mountable to a bottom bracket shell of a bicycle frame. The bicycle transmission assembly includes an input crank assembly, an output chainring, a planetary gear mechanism, a control system and a mounting system. The input crank assembly is mounted to a rotatable crank axle mounted to the bottom bracket shell. The planetary gear mechanism is mounted to the bottom bracket shell and provides a plurality of transmission paths. The planetary gear mechanism includes a sun gear, a ring gear and a locking element operatively connecting the sun gear and the ring gear. The control system is operatively connected to the planetary gear mechanism for selecting one of the transmission paths.

12 Claims, 9 Drawing Sheets

BICYCLE TRANSMISSION

RELATED APPLICATION DATA

This application is a continuation of U.S. application Ser. No. 11/734,236 filed on Apr. 11, 2007, entitled "Mounting System for an Internal Bicycle Transmission."

BACKGROUND OF THE INVENTION

The present invention relates to bicycle transmissions and more particularly to a bicycle transmission that includes a locking element operatively connecting a sun gear and a ring gear of the bicycle transmission.

SUMMARY OF THE INVENTION

The present invention provides a bicycle transmission that is mountable to a bottom bracket shell of a bicycle frame. The bicycle transmission generally includes an input crank assembly, an output chainring for engaging a bicycle drive chain, a planetary gear mechanism, a control system. The input crank assembly is mounted to a rotatable crank axle mounted to the bottom bracket shell. The planetary gear mechanism is mounted to the bottom bracket shell and provides a plurality of transmission paths. The planetary gear mechanism includes a sun gear, a ring gear and a locking element operatively connecting the sun gear and the ring gear. The control system is operatively connected to the planetary gear mechanism for selecting one of the transmission paths.

In one embodiment of the present invention, the planetary gear mechanism further includes a plurality of planet gears. The output chainring is nonrotatably connected to the ring gear. The planet gears are operatively connected to the input crank assembly. The control system includes a sun pawl, a collar and a shift actuator. The collar is configured to support the sun pawl. The sun pawl is configured to be selectively positionable between an engaged position nonrotatably connecting the sun gear to the collar, and a disengaged position allowing the sun gear to rotate relative to the collar. The shift actuator selectively positions the sun pawl between the engaged and disengaged positions. When the sun pawl is in the engaged position, rotation of the input crank assembly drives the planet gears to overdrive the ring gear in a first transmission path. When the sun pawl is in the disengaged position, the rotation of the input crank assembly drives the planet gears to rotate the sun gear until the locking element engages the ring gear, locking the sun gear to the ring gear in a second transmission path. In one embodiment of the present invention, the locking element is a pawl.

These and other features and advantages of the present invention will be more fully understood from the following description of one or more embodiments of the invention, taken together with the accompanying drawings.

DETAILED DESCRIPTION

FIGS. 1-9 illustrate a bicycle transmission assembly 10 according to one embodiment of the present invention. Looking to FIGS. 1-4, the bicycle transmission assembly 10 is externally mounted to a bottom bracket shell 12 of a bicycle frame 14. The bottom bracket shell 12 has an axis 16 and connects various tubes of the bicycle frame 14. The bicycle transmission assembly 10 generally includes an input crank assembly 18, an output chainring 20, a planetary gear mechanism 22, a control system 24 and a mounting system 26. The crank assembly 18 is rotatably mounted to the bottom bracket shell 12. The crank assembly 18 includes a bottom bracket 28 that extends through the bottom bracket shell 12, with first and second crank arms 30, 32 rotatably connected to a crank axle 34. The bottom bracket 28 includes the crank axle 34 and bearings 36.

The planetary gear mechanism 22 is mounted coaxially about the shell axis 16 and disposed inboard of the first crank arm 30. The planetary gear mechanism 22 generally includes planet gears 38, a sun gear 40 and a ring gear 42. The planet gears 38 are rotatably supported on planet shafts 44 that are fixed to a carrier 46 and the first crank arm 30 by bolts 48. Looking to FIGS. 5-7, the planet gears 38 mesh the sun gear 40 with the ring gear 42. The ring gear 42 includes a first plurality of teeth 50 engaged with teeth 51 of the planet gears 38 and a second plurality of teeth 52 engageable with ring pawls 54 located on the sun gear 40. The sun gear 40 includes a first plurality of teeth 56 engaged with the teeth 51 of the planet gears 38 and a second plurality of teeth 58 engageable with sun pawls 60. The sun and ring gears 40, 42 are rotatably mounted coaxially about the shell axis 16. The output chainring 20 is nonrotatably connected to the ring gear 42 (see FIG. 4). The output chainring 20 engages a bicycle drive chain 59 (see FIG. 3). Preferably, the chainring 20 is aligned with a middle sprocket of a rear wheel sprocket cassette (not shown) to optimize shifting performance.

Preferably, the control system 24 is mounted coaxially about the shell axis 16 and generally includes the sun pawls 60, a collar 62 and a shift actuator 64. The collar 62 provides a seat, in this embodiment recesses 66, for the sun pawls 60 and the sun gear 40 is rotatable about the collar 62. The shift actuator 64 includes shift cams 68 and a lever 70 that is connected to a Bowden control cable (not shown). The shift cams 68 are received in the recesses 66 on the collar 62 and are reciprocally displaceable along the recesses 66. The sun pawls 60 are configured to be positionable between an engaged position (see FIG. 6), nonrotatably connecting or locking the sun gear 40 to the collar 62, and a disengaged position (see FIG. 7), allowing the sun gear 40 to rotate relative to the collar 62. A spring biases the sun pawls 60 away from the teeth 58 of the sun gear 40 or toward the disengaged position. The shift cams 68 engage the sun pawls 60 preventing the sun pawls 60 from disengaging from the sun gear teeth 58. When the control cable is actuated, the shift cams 68 displace along the recesses 66 to position the sun pawls 60 in either the engaged or disengaged positions.

Figure 8:
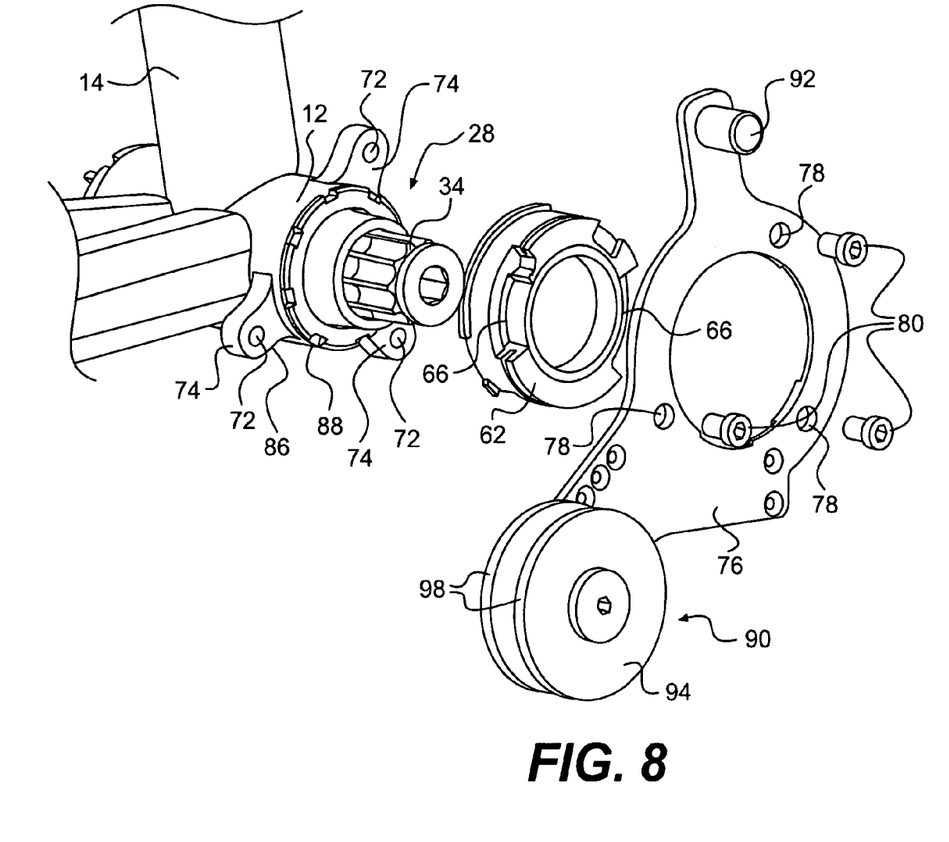
FIG. 8 is an exploded outboard view of a portion of the bicycle transmission assembly of FIG. 1.
Figure 9:
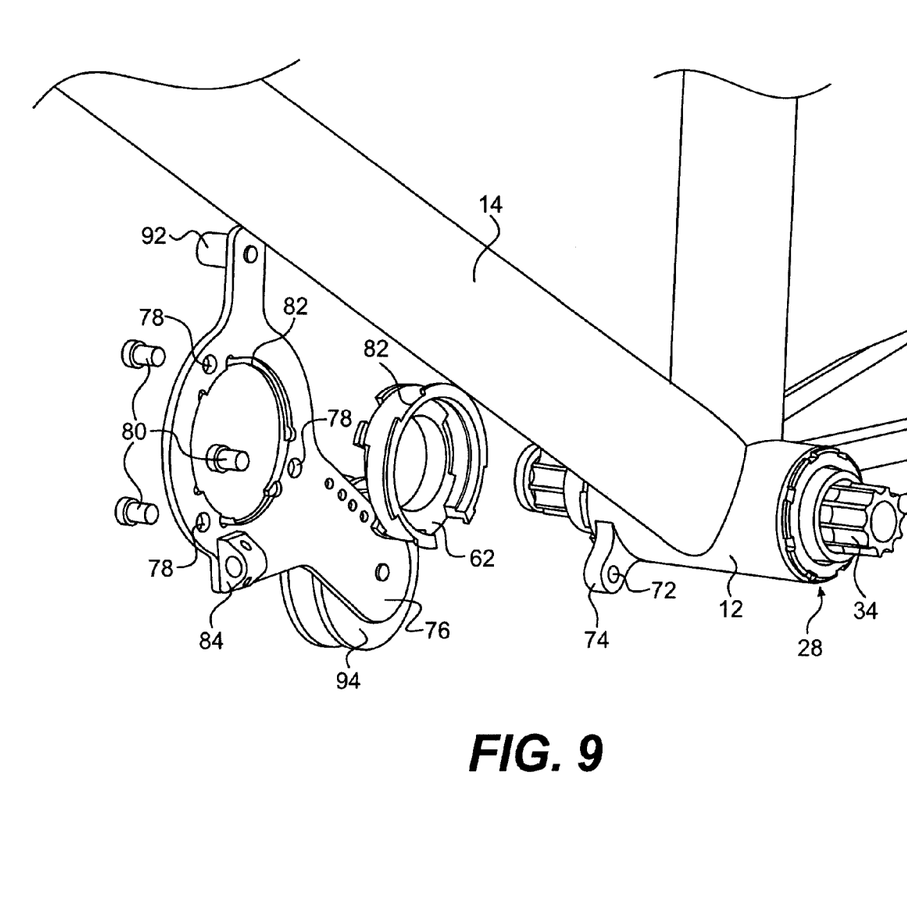
FIG. 9 is an exploded inboard view of a portion of the bicycle transmission assembly of FIG. 1.

Looking to FIGS. 8 and 9, the mounting system 26 includes at least one attachment point 72 disposed on at least one frame boss 74 extending radially outwardly from the bottom bracket shell 12. Preferably, the mounting system 26 includes three attachment points 72 disposed on three frame bosses 74 that are equidistantly spaced about the bottom bracket shell 12 or about 120 degrees apart. The mounting system 26 also includes a mounting plate 76, preferably mounted coaxially about the shell axis 16. The mounting plate 76 includes three holes 78 for receiving bolts 80 to mount the plate 76 to the frame bosses 74. The mounting plate 76 and collar 62 include mating projections and recesses 82 to nonrotatably connect the collar 62 to the mounting plate 76. The mounting plate 76 may include a cable housing stop 84 for the Bowden control cable connected to the lever 70.

Figure 3:
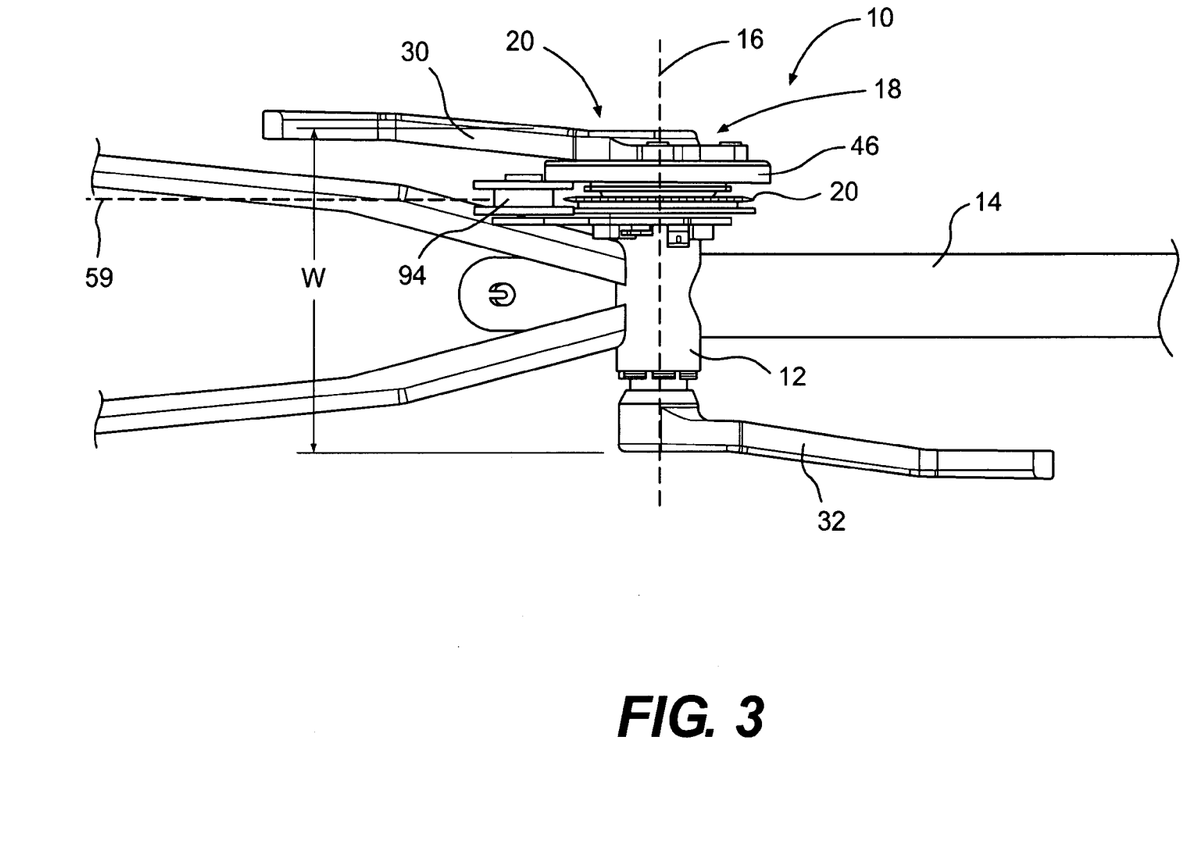
FIG. 3 is a bottom view of the bicycle transmission assembly of FIG. 1.
Figure 4:
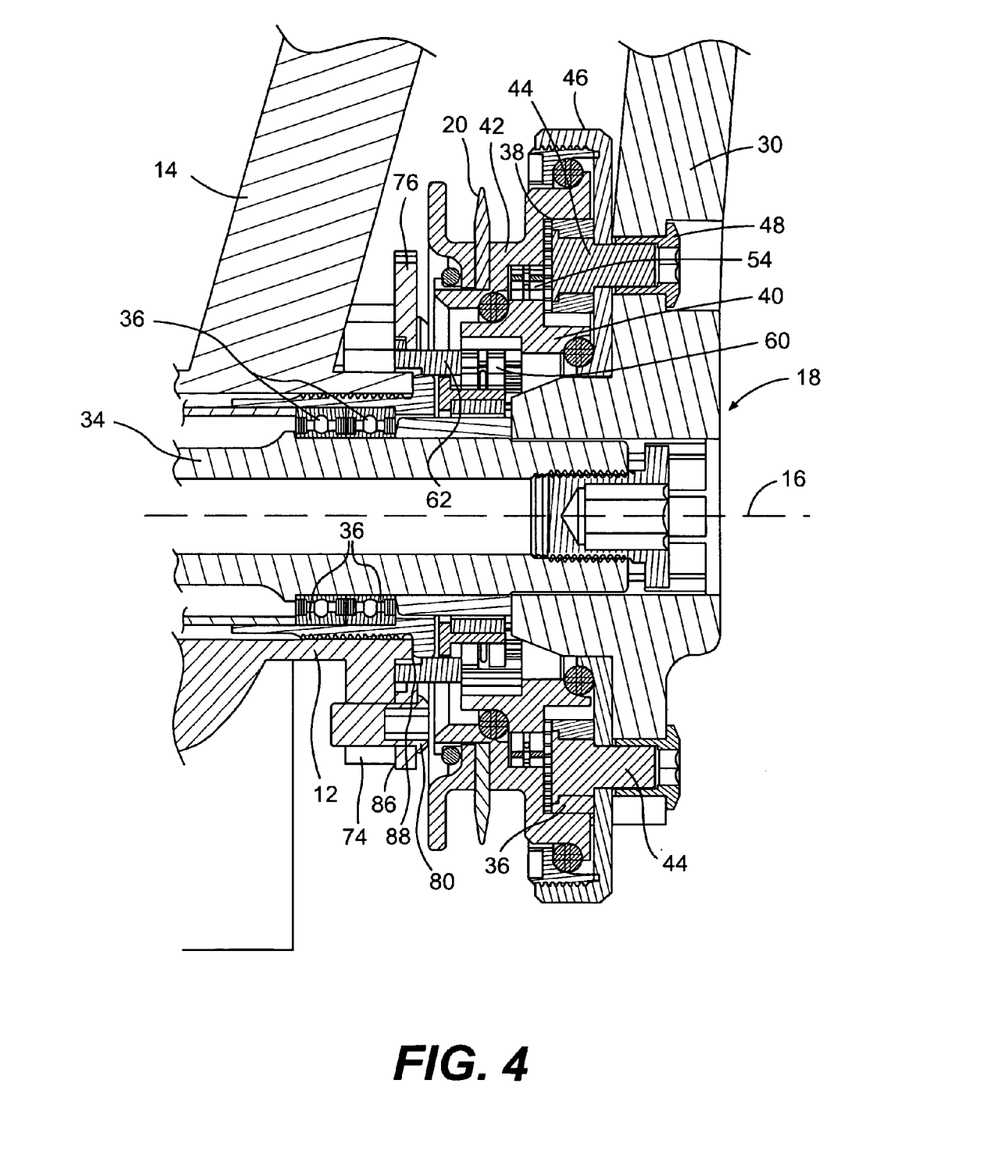
FIG. 4 is a cross-sectional view of the bicycle transmission assembly of FIG. 1.
Figure 5:
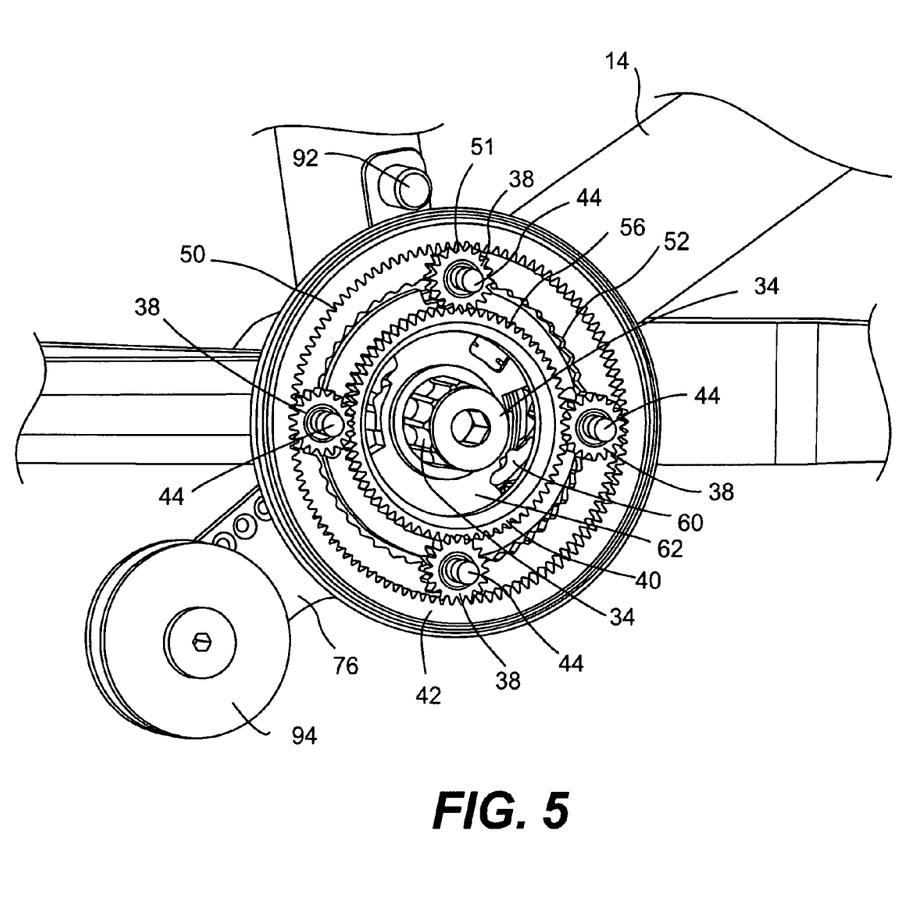
FIGS. 5-7 are cut-away views of the bicycle transmission assembly of FIG. 1.
Figure 6:
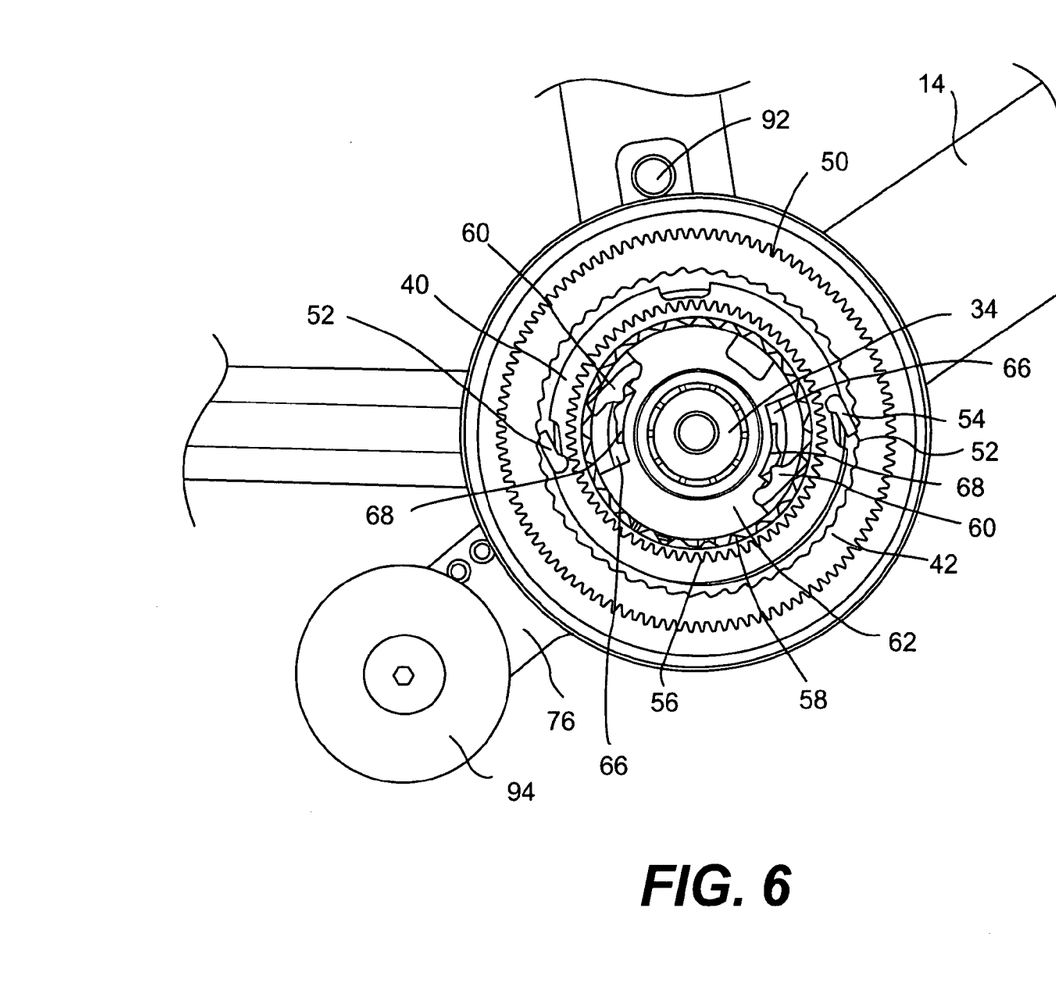
Figure 7:
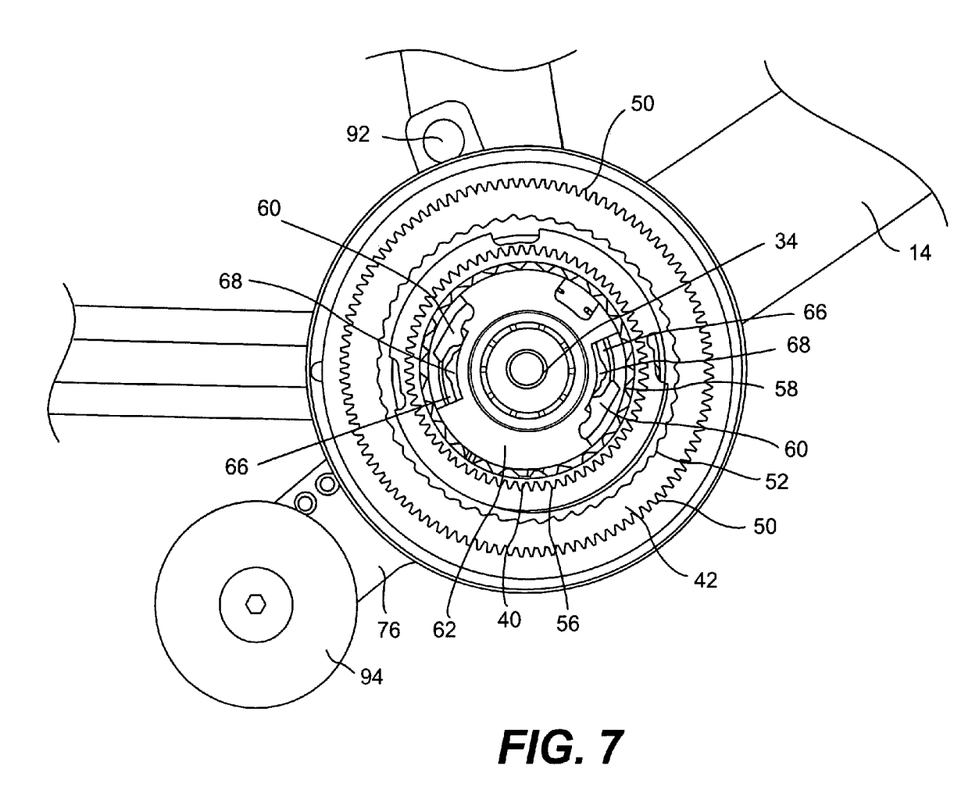

Preferably, by providing attachment points 72 on the frame bosses 74 extending radially from the bottom bracket shell 12, the bicycle transmission assembly 10 may be mounted without increasing the existing crank assembly width W (see FIG. 3). In the embodiment shown, an outboard surface 86 of the attachment point 72 is positioned axially inboard of an outboard surface 88 of the bottom bracket shell 12.

Figure 1:
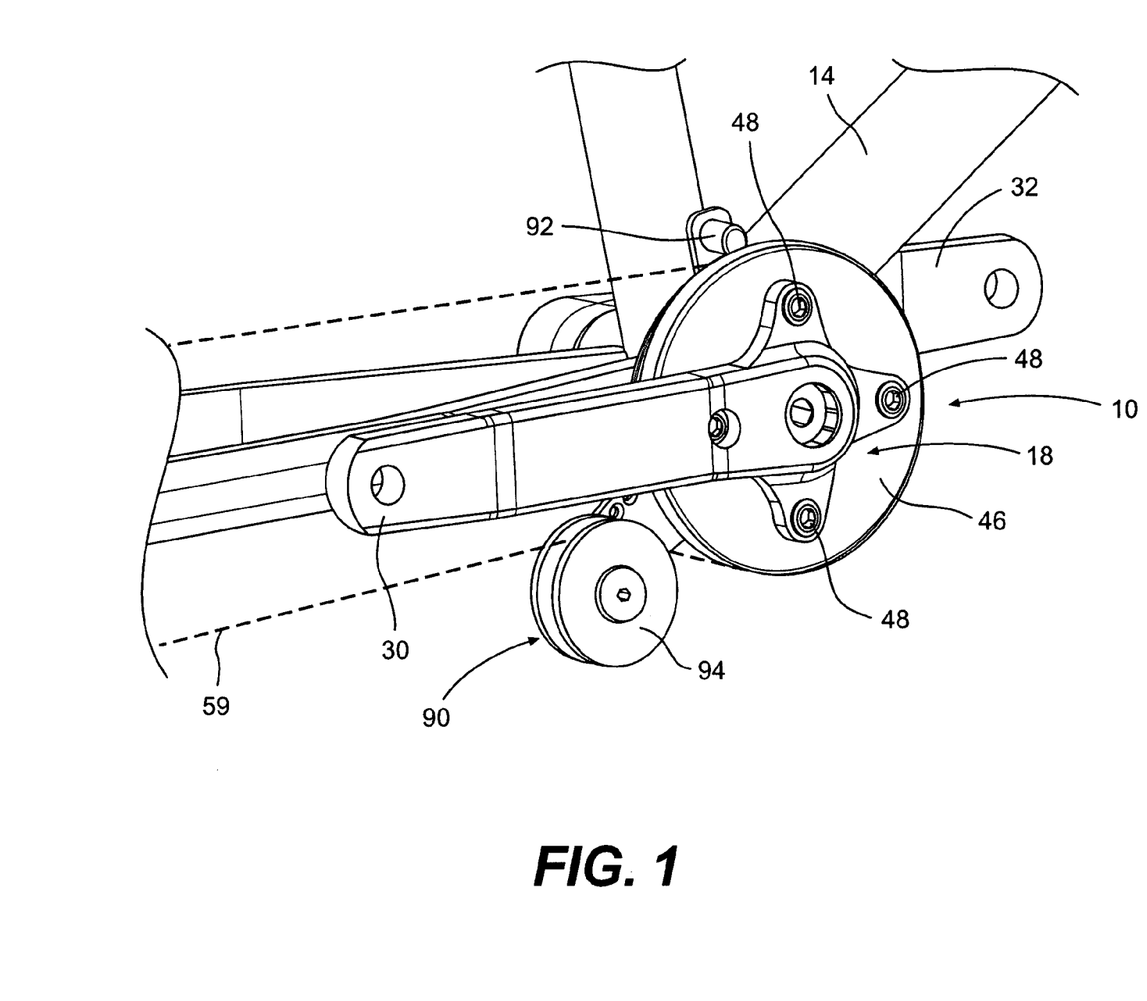
FIG. 1 is a perspective outboard view of a bicycle transmission assembly according to one embodiment of the present invention.
Figure 2:
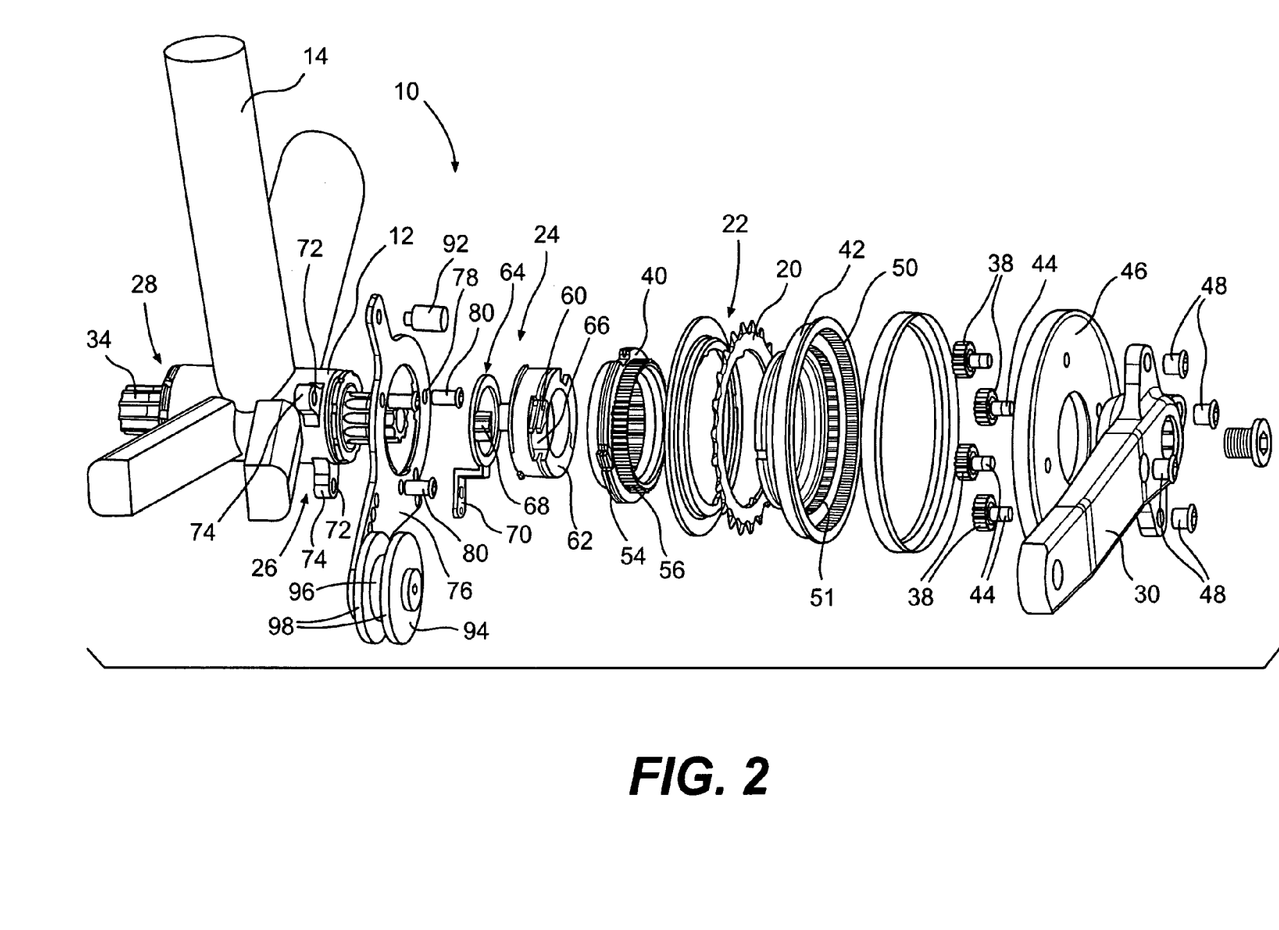
FIG. 2 is an exploded view of the bicycle transmission assembly of FIG. 1.

Looking to FIGS. 1, 2 and 8, in one embodiment of the present invention, a chain management system 90 is attached to the mounting plate 76. The chain management system 90 includes a chain guide 92 for preventing disengagement of the chain 59 from the output chainring and/or a roller 94 rotatably attached to the mounting plate 76 for rollingly guiding the chain 59. The chain 59 runs under the chain guide 92. The roller 94 includes a roller portion 96 for the chain 59 to ride on and two sidewalls 98 to axially position the chain 59. Preferably, the roller 94 is aligned with the chainring 20. In other embodiments, the roller 94 may be mounted to alternative positions on the mounting plate 76.

The bicycle transmission provides at least two transmission paths. When the sun pawl 60 is in the engaged position, the sun gear 40 is locked to the collar 62, wherein rotation of the input crank assembly 18 drives the planet gears 38 to rotate about the planet shafts 44 thereby overdriving the ring gear 42, resulting in the output chainring 20 being rotated faster than the input crank arms 18. When the sun pawl 60 is in the disengaged position, the sun gear 40 is unlocked from the collar 62, and initial rotation of the input crank assembly 18 first drives the planet gears 38 to rotate about the planet shafts 44 thereby rotating the sun gear 40 until the ring pawls 54 engage the ring gear 42 thereby locking the sun gear 40 to the ring gear 42. Continued rotation of the crank assembly 18, directly drives the both the sun and ring gears 40, 42 in a 1:1 gear ratio.

While this invention has been described by reference to particular embodiments, it should be understood that numerous changes could be made within the spirit and scope of the inventive concepts described. Accordingly, it is intended that the invention not be limited to the disclosed embodiment, but that it have the full scope permitted by the language of the following claims.

What is claimed:

1. A bicycle transmission assembly mountable to a bottom bracket shell of a bicycle frame, the bicycle transmission assembly comprising:
    an input crank assembly mounted to a rotatable crank axle mounted to the bottom bracket shell;
    an output chainring for engaging a bicycle drive chain;
    a planetary gear mechanism mounted to the bottom bracket shell and providing a plurality of transmission paths, the planetary gear mechanism including a plurality of planet gears operatively connected to the input crank assembly, a sun gear, a ring gear and a locking element operatively connecting the sun gear and the ring gear; and
    a control system operatively connected to the planetary gear mechanism for selecting one of the plurality of transmission paths,
    wherein rotation of the input crank assembly drives the planet gears to overdrive the ring gear in a first transmission path of the plurality of transmission paths.

2. The bicycle transmission assembly of claim 1, wherein the output chainring is nonrotatably connected to the ring gear.

3. The bicycle transmission assembly of claim 2, wherein the control system includes:
    a sun pawl;
    a collar configured to support the sun pawl, the sun pawl configured to be selectively positionable between an engaged position nonrotatably connecting the sun gear to the collar and a disengaged position allowing the sun gear to rotate relative to the collar; and
    a shift actuator for selectively positioning the sun pawl between the engaged and disengaged positions.

4. The bicycle transmission assembly of claim 3, wherein when the sun pawl is in the engaged position, rotation of the input crank assembly drives the planet gears to overdrive the ring gear in the first transmission path.

5. The bicycle transmission assembly of claim 4, wherein when the sun pawl is in the disengaged position, rotation of the input crank assembly drives the planet gears to rotate the sun gear until the locking element engages the ring gear, locking the sun gear to the ring gear in a second transmission path.

6. The bicycle transmission assembly of claim 5, wherein the locking element is a pawl.

7. A bicycle transmission assembly mountable to a bottom bracket shell of a bicycle frame, the bicycle transmission assembly comprising:
    input crank means mounted to a rotatable crank axle mounted to the bottom bracket shell;
    an output chainring for engaging a chain;
    planetary gear means mounted to the bottom bracket shell and providing a plurality of transmission paths, the planetary gear means including a plurality of planet gears operatively connected to the input crank assembly, a sun gear, a ring gear and locking means operatively connecting the sun gear and the ring gear; and
    control means operatively connected to the planetary gear means for selecting one of the plurality of transmission paths,
    wherein rotation of the input crank means drives the planet gears to overdrive the ring gear in a first transmission path of the plurality of transmission paths.

8. The bicycle transmission assembly of claim 7, wherein the output chainring is nonrotatably connected to the ring gear.

9. The bicycle transmission assembly of claim 8, wherein the control means includes:
    a sun pawl;
    collar means configured to support the sun pawl, the sun pawl configured to be selectively positionable between an engaged position nonrotatably connecting the sun gear to the collar means and a disengaged position allowing the sun gear to rotate relative to the collar means; and
    a shift actuator means for selectively positioning the sun pawl between the engaged and disengaged positions.

10. The bicycle transmission assembly of claim 9, wherein when the sun pawl is in the engaged position, rotation of the input crank means drives the planet gear to overdrive the ring gear in the first transmission path.

11. The bicycle transmission assembly of claim 10, wherein when the sun pawl is in the disengaged position, rotation of the input crank means drives the planet gears to rotate the sun gear until the locking means engages the ring gear, locking the sun gear to the ring gear in a second transmission path.

12. The bicycle transmission assembly of claim 11, wherein the locking means is a pawl.

* * * * *